(12) United States Patent
Goren

(10) Patent No.: US 6,741,235 B1
(45) Date of Patent: May 25, 2004

(54) RAPID ENTRY OF DATA AND INFORMATION ON A REDUCED SIZE INPUT AREA

(76) Inventor: Michael Goren, 17 Dublin Dr., Niskayuna, NY (US) 12309

( * ) Notice: Subject to any disclaimer, the term of this patent is extended or adjusted under 35 U.S.C. 154(b) by 181 days.

(21) Appl. No.: 09/592,323

(22) Filed: Jun. 13, 2000

(51) Int. Cl.[7] .................................. G09G 5/00
(52) U.S. Cl. ............... 345/173; 345/168; 345/169; 345/776; 345/854; 345/855; 345/864; 345/825
(58) Field of Search .................. 345/169, 172, 345/173, 767, 808, 821, 822, 813, 974, 975, 773, 780, 783, 810, 825, 828, 840, 841, 864

(56) References Cited

U.S. PATENT DOCUMENTS

| | | | |
|---|---|---|---|
| 4,737,980 A | 4/1988 | Curtin, IV | 379/97 |
| 4,804,279 A | 2/1989 | Berkelmans et al. | 400/94 |
| 4,913,573 A | 4/1990 | Retter | 400/489 |
| 5,003,301 A | 3/1991 | Romberg | 340/711 |
| 5,109,352 A | 4/1992 | O'Dell | 395/150 |
| 5,124,702 A | 6/1992 | van Ardenne | 341/22 |
| 5,148,155 A | 9/1992 | Martin et al. | 340/712 |
| 5,210,689 A | 5/1993 | Baker et al. | 364/419 |
| 5,260,697 A | 11/1993 | Barrett et al. | 345/173 |
| 5,521,986 A | 5/1996 | Curtin, IV | 382/187 |
| 5,613,137 A | 3/1997 | Bertram et al. | 395/800 |
| 5,627,980 A * | 5/1997 | Schilit et al. | 345/841 |
| 5,657,378 A | 8/1997 | Haddock et al. | 379/93.23 |
| 5,664,896 A | 9/1997 | Blumberg | 400/485 |
| 5,681,220 A | 10/1997 | Bertram et al. | 463/37 |
| 5,689,253 A | 11/1997 | Hargreaves et al. | 341/22 |
| 5,786,776 A | 7/1998 | Kisaichi et al. | 341/23 |
| 5,790,115 A * | 8/1998 | Pleyer et al. | 345/327 |
| 5,797,098 A * | 8/1998 | Schroeder et al. | 455/464 |
| 5,799,267 A * | 8/1998 | Siegal | 704/1 |
| 5,870,492 A | 2/1999 | Shimizu et al. | 382/187 |
| 5,875,311 A | 2/1999 | Bertram et al. | 395/309 |
| 5,896,126 A | 4/1999 | Shieh | 345/173 |
| 5,900,864 A * | 5/1999 | Macdonald | 345/169 |
| 5,924,803 A | 7/1999 | Curtin, IV | 400/100 |
| 5,943,044 A | 8/1999 | Martinelli et al. | 345/174 |
| 5,945,928 A | 8/1999 | Kushler et al. | 341/28 |
| 5,956,021 A * | 9/1999 | Kubota et al. | 345/179 |
| 5,974,238 A | 10/1999 | Chase, Jr. | 395/200.78 |
| 5,982,303 A | 11/1999 | Smith | 341/22 |
| 5,990,890 A | 11/1999 | Etheredge | 345/347 |
| 6,002,390 A * | 12/1999 | Masui | 345/173 |
| 6,005,496 A | 12/1999 | Hargreaves et al. | 341/22 |
| 6,008,799 A * | 12/1999 | Van Kleeck | 345/173 |
| 6,011,554 A | 1/2000 | King et al. | 345/352 |

(List continued on next page.)

FOREIGN PATENT DOCUMENTS

| | | |
|---|---|---|
| AU | 693553 | 11/1998 |
| NZ | 285346 | 6/1999 |

OTHER PUBLICATIONS

US 6,346,955, 2/2002, Moon (withdrawn)
Miika Silfverberg, I. Scott MacKenzie, and Panu Korhonen, Predicting Text Entry Speed on Mobile Phones, Apr., 2000, 30 pages.
Pages from www.thumbprint.com downloaded Jan. 4, 2002. (Publication date unknown.).

*Primary Examiner*—Bipin Shalwala
*Assistant Examiner*—David L. Lewis
(74) *Attorney, Agent, or Firm*—Fliesler Meyer LLP

(57) ABSTRACT

A method and device designed to improve the speed, accuracy, and ease of entry of characters and other symbols by a user. The device is designed to use a reduced size input area as an input source and optionally as a display screen. A set of characters or other symbols is divided into subsets, each subset being represented by a control button for display on the reduced size input area for user selection. A user's selection of a control button produces a secondary set of buttons representing the characters or other symbols in the selected subset for user selection, storage, and display.

26 Claims, 7 Drawing Sheets

U.S. PATENT DOCUMENTS

| | | | | |
|---|---|---|---|---|
| 6,016,142 A | * | 1/2000 | Chang et al. | 345/334 |
| 6,094,197 A | | 7/2000 | Buxton et al. | 345/358 |
| 6,098,086 A | | 8/2000 | Krueger | 707/535 |
| 6,121,960 A | * | 9/2000 | Carroll et al. | 345/173 |
| 6,169,538 B1 | * | 1/2001 | Nowlan et al. | 345/168 |
| 6,271,835 B1 | * | 8/2001 | Hoeksma | 345/168 |
| 6,295,052 B1 | | 9/2001 | Kato | 345/179 |
| 6,307,541 B1 | * | 10/2001 | Ho et al. | 345/171 |
| 6,320,570 B2 | | 11/2001 | Robb | 345/179 |
| 6,377,966 B1 | * | 4/2002 | Cooper et al. | 707/542 |
| 6,389,386 B1 | | 5/2002 | Hetherington | 704/8 |

\* cited by examiner

RAPID ENTRY OF DATA AND INFORMATION ON A REDUCED SIZE INPUT AREA

FIELD OF USE

The present invention relates to electronic input devices, and particularly to providing a space saving method and system for rapid entry of data and information.

BACKGROUND

Currently, a large portion of computing devices are increasingly becoming compact and in many instances portable. These computing devices include personal digital assistants (PDAs), mobile phones, web appliances, and other information devices. There has also been an increased desire to have these devices interconnected not only with each other but also with the Internet.

But smaller computing devices require smaller input devices. Touch-screens, touch-pads, and smaller keyboards are commonly being used for entering or inputting data or other information into these smaller devices. However, the current use of these smaller input devices has several drawbacks.

First, displaying a touch-sensitive keyboard on these smaller screens or using a smaller keyboard has resulted in keys too small for ergonomic comfort. In addition, the error rate associated with these smaller keyboards is increased compared to larger keyboards, while the overall input speed is decreased due to the accidental touch by the user of more than one key at a time.

Second, while the stylus, or pen based method has its advantages over the smaller keyboards, it currently requires handwritten symbols. These handwritten symbols are usually designed specially for use with a particular device and typically require the user to learn a new language of characters while also requiring the computer to translate the input handwritten characters into a known associated character. This type of input also increases the error rate and decreases the input speed due to either the user not knowing the new language and having to either stop and look at a conversion card or guess, or the computing device mismatching the input character with the wrong symbol. Moreover, if the user has poor handwriting, the error rate will further increase. The stylus is also often lost or misplaced, making input that much more difficult. To avoid some of the problems associated with a stylus, some users carry a larger keyboard to plug into their computing devices; nonetheless, these keyboards have additional weight and space requirements, sometimes defeating the portability purposes of having the small computing device.

Third, using a reduced keyboard disambiguating computer, which has a reduced set of keys, where each key represents numerous characters and/or numbers, is also inefficient for practical use. A disambiguating computer processes an entered keystroke sequence by matching the different combinations of letters associated with each keystroke to a stored list of words. The words matching the combinations of letters are then displayed for user selection. This method requires a user to enter a combination of keystrokes and then choose from a list of words. The list the user must select from is often quite long requiring the user to read through each potential choice to find the desired word. Additionally, by limiting the user to the set of choices provided by the computer, the user is limited in word choice as the user may not enter words that are not in the computer's stored vocabulary. This type of input, while reducing the error rate associated with the stylus, is much slower and often frustrating to the user due to the need to press a sequence of keys and then filter through a list of computer generated choices. Moreover, disambiguating computers, as well as stylus-based devices, may be less useful with different languages or when more than one language is used.

Fourth, the communication capabilities of these portable devices are important. While some are completely stand alone devices, limiting the information available to the user, other devices have the capability to communicate with each other and link up to personal computers to store and receive information. Still, the user is often limited to a small category of programs and devices that the user may effectively communicate with through the device.

Accordingly, with the current trend of portable computing devices and increased communications, it is desirable to create a device which solves the above disadvantages by improving the speed, accuracy and ease of inputting information yet still fulfills the goal of portability and interconnectivity.

SUMMARY OF THE INVENTION

An embodiment of the present invention is directed to a system and method for receiving and displaying information in response to a user's input. Initially, a set of control buttons are displayed on an input source. Each control button has associated with it a subset of characters or symbols that are selected from a larger set of characters or symbols. Input is received from a user who selects a control button and in response to the user's selection, a set of secondary buttons is displayed. These secondary buttons represent the characters or symbols associated with the user-selected control button. Upon user selection of a secondary button, the device stores the selected character or symbol and displays the selected character or symbol on a viewing area.

In another embodiment, there may be two input sources. The first input source is a keypad that is used to represent the control buttons. Upon selection by a user of one of the control buttons, the associated set of secondary buttons are then displayed on a second input source. The user may select the desired secondary key from the second input source. The character or symbol represented by the user-selected secondary key is then stored on a storage medium and displayed on a viewing area.

In some embodiments, the input source may be a touch-sensitive display or other on-screen keyboard. Further, some embodiments may be capable of communicating with other computing devices, software programs, and the Internet. Additionally, some embodiments may have a speaker and/or microphone for voice-activated input, recording, and playing audio information.

BRIEF DESCRIPTION OF THE DRAWINGS

The invention will be described with respect to particular embodiments thereof, and reference will be made to the drawings in which.

DETAILED DESCRIPTION

Generally described, the system and method in accordance with an embodiment of the present invention is designed to improve the speed, accuracy, and ease of inputting information into a computing device while limiting the overall size of the device. A computing device in accordance with the invention can be any type of computing device that includes a processor, including desktop computers, but will often also be small and portable, including personal digital assistants (PDAs), mobile phones, web appliances, digital remote controls, and other information devices.

A device in accordance with one embodiment of the invention has a viewing area that can be used for both input and display of information or alternatively just for input. The viewing area is used for displaying a short list of characters or other symbols in an arranged order. Each character or symbol in the short list is each in turn associated with a subset of characters or symbols from which the user may easily make an input selection. A user-selected character or other symbol is then displayed either on a separate portion of the same viewing area, on a separate display screen, or on both. Examples of embodiments of the present invention are described more fully below.

Figure 1:
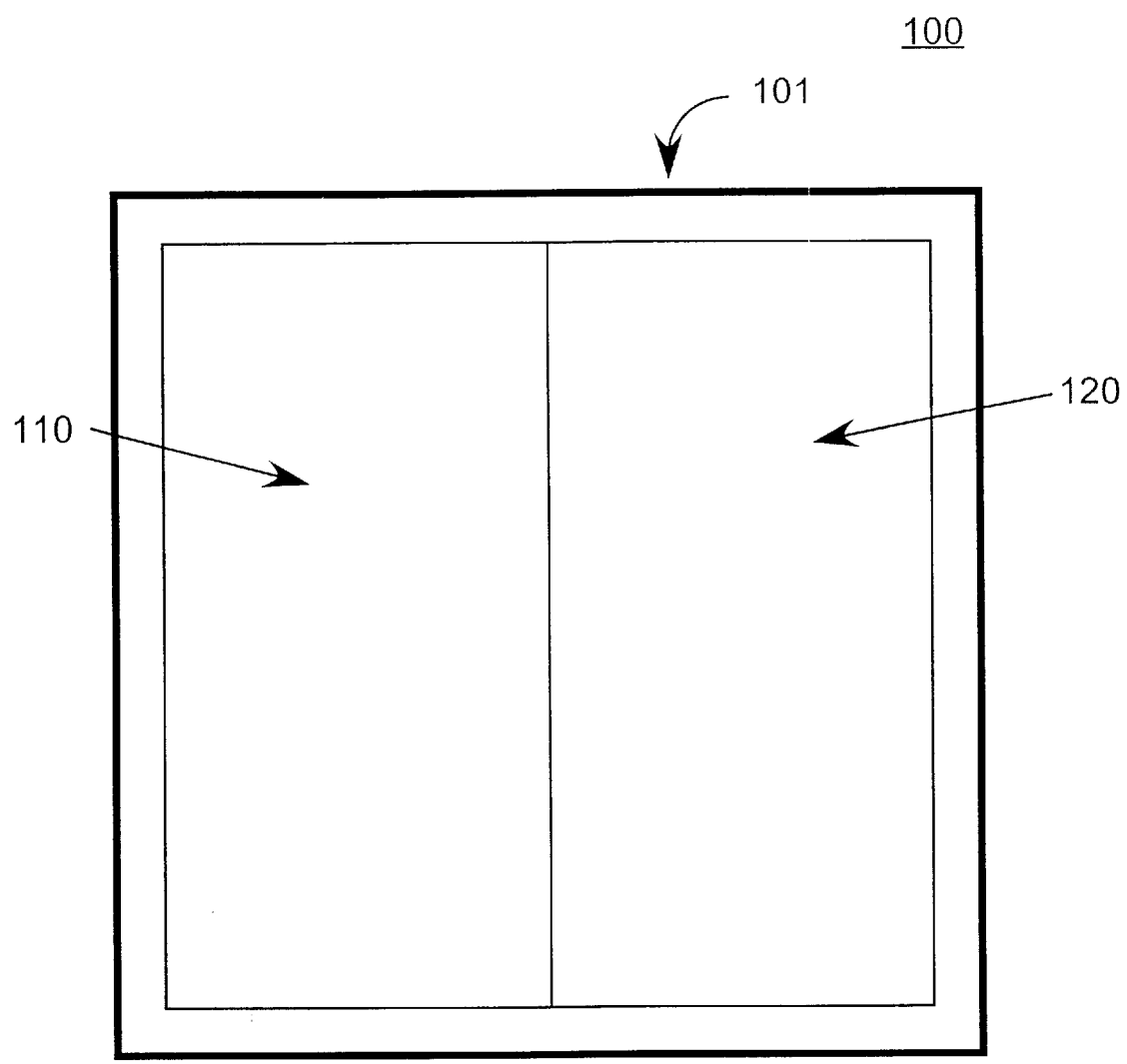
FIG. 1 is a representational block diagram of an embodiment of the viewing area of a device in accordance with the present invention.

FIG. 1 is a block diagram of one embodiment of the viewing area 100 of the present invention that uses a touch-sensitive screen 101 for both the input section and the display section 120. The arrangement of the input section 110 and display section 120 of the viewing area 100 can be presented tiled side-by-side, as shown in FIG. 1, tiled top-to-bottom, or in any other arrangement. The input section 110 of the viewing area 100 displays characters or other symbols for selection by a user. The display section 120 of the viewing area 100 subsequently displays the characters or other symbols that the user has selected. In other embodiments, rather than being part of the same viewing area 100, the display section 120 can be viewed on a physically separate display (not shown), thereby allowing the user full use of the viewing area 100 as the input section 110. Such a physically separate display can be incorporated in the same device as input section 110, or it can be incorporated into another device that communicates with the device incorporating input section 110.

A processor (not shown) is in communication with the viewing area 100 for sending and receiving signals. When a user enters information in the input section 110, the processor receives a signal from the input section 110 of the viewing area 100 and either displays additional information (such as a set of characters or other symbols) on the input section 110 or stores the information input by the user on a storage medium (not shown) and sends a signal to the display section 120 to display the information input by the user. The display section 120 of the viewing area 100, in response to the processor signal, displays the information.

Figure 2:
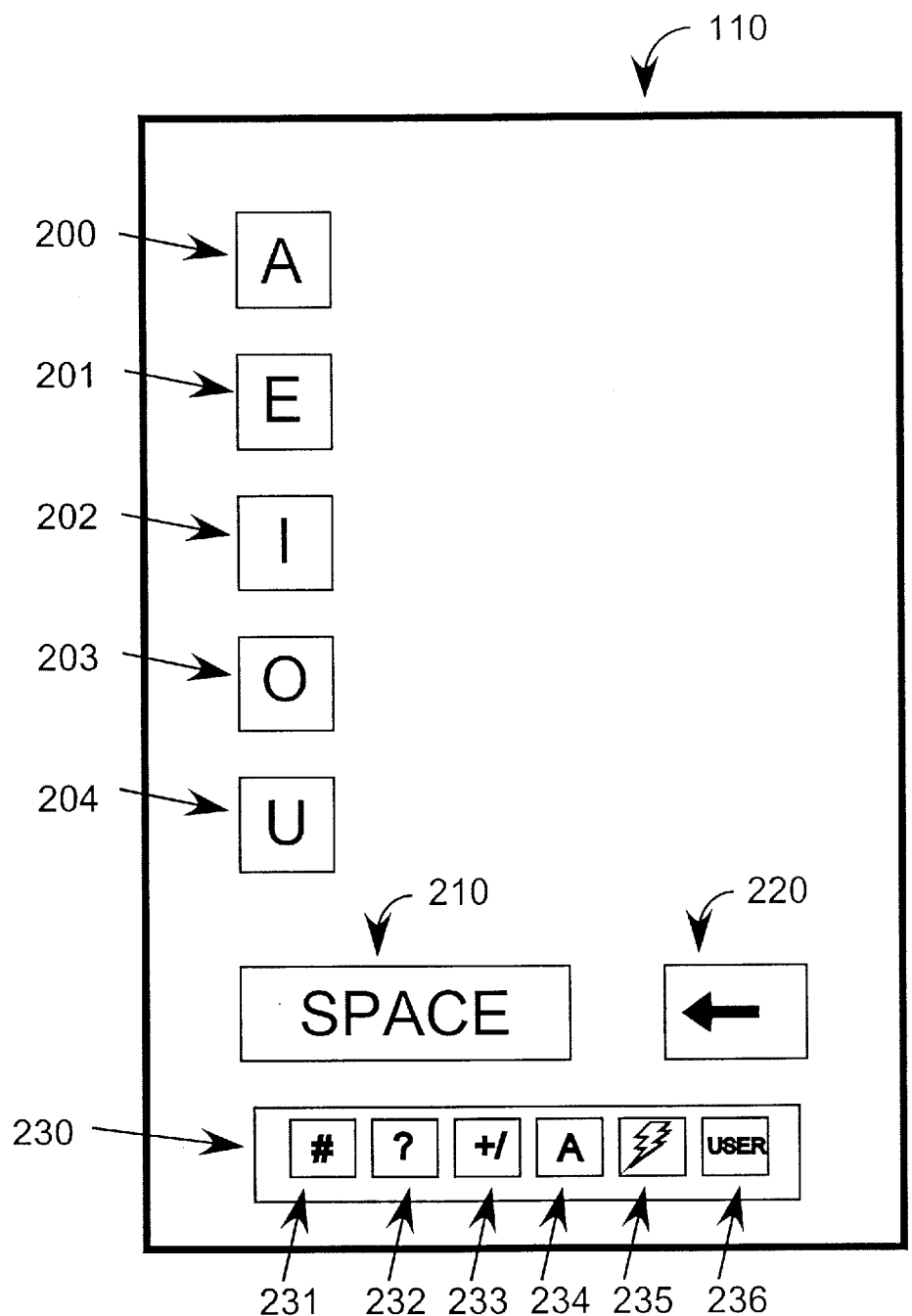
FIG. 2 is a representational diagram of an embodiment of the input section of the viewing area of a device in accordance with the present invention.

FIG. 2 shows an embodiment of the input section 110 of the viewing area 100. A short set of graphic images or characters is initially displayed on the input section 110 including, among other images, control buttons 200–204, a space bar button 210, a backspace button 220, and a menu bar 230.

The control buttons can be any selection of letters, numbers, characters, mathematical symbols, punctuation, or other objects. The control buttons 200–204, for example, are the buttons for the vowels of the English alphabet. Each control button 200–204 has a set of secondary buttons associated with it. In an embodiment, the control button 200 has associated with it secondary buttons for representing the letters A, B, C, and D. Control button 201 has secondary buttons E, F, G, and H associated with it. Control button 202 has secondary buttons I, J, K, L, M, and N associated with it. Control button 203 has secondary buttons O, P, Q, R, S, and T associated with it, and control button 204 has secondary buttons U, V, W, X, Y, and Z associated with it. As described, in some embodiments, the sets of secondary buttons include a button for the character represented as the selected control button, namely A, E, 1, 0, or U, depending which is selected by the user.

Figure 3:
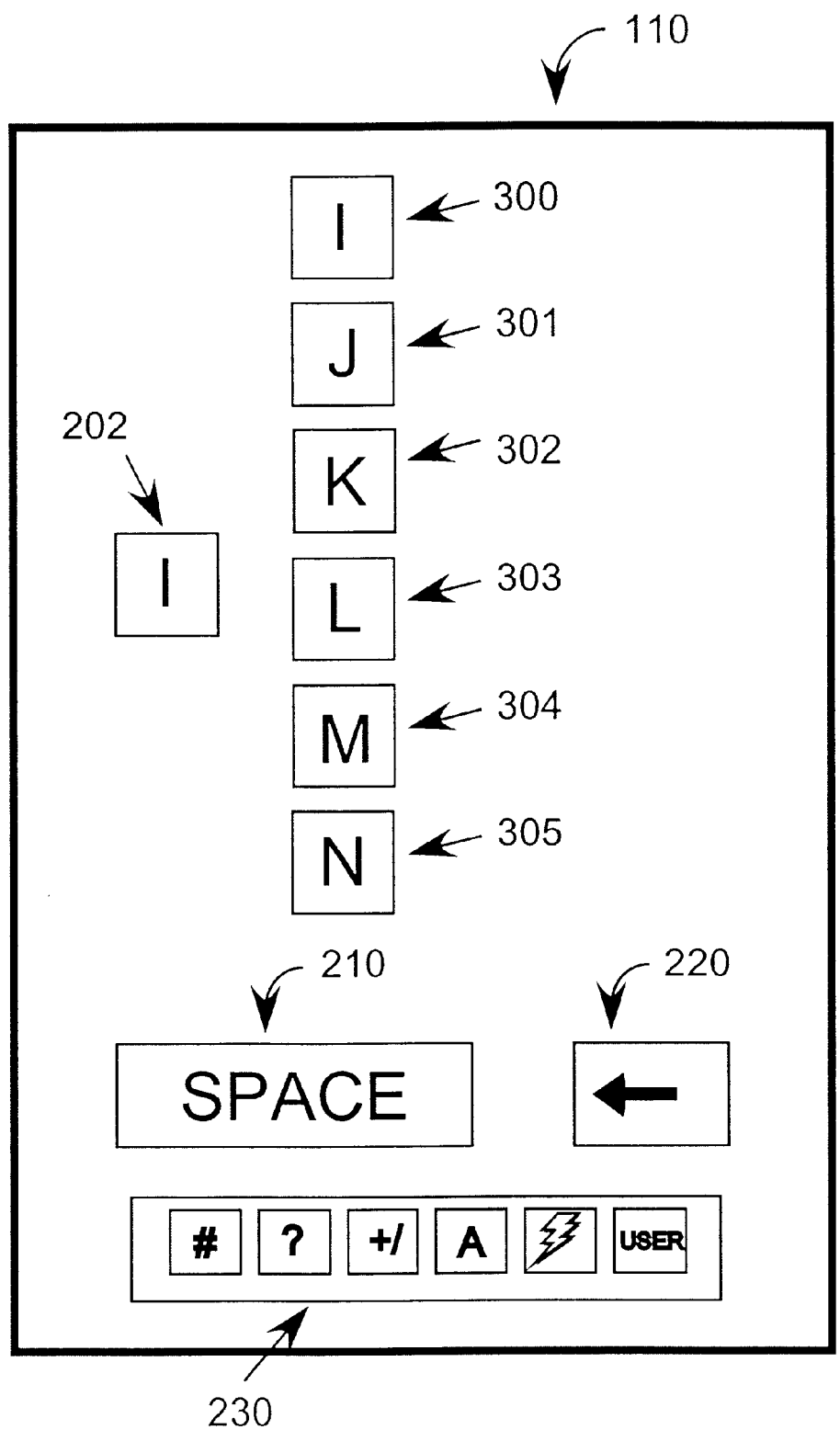
FIG. 3 is a representational diagram of an embodiment of the input section of the viewing area of a device displaying secondary buttons in accordance with the present invention.

Upon selection by a user of one of the desired control buttons 200–204, the processor receives a signal, and in response removes the non-selected control buttons and displays the associated list of secondary buttons. For instance, referring to FIG. 3, if the user selects control button 202, the remaining control buttons 200, 201, 203, and 204 are removed from display in the input section 110, and the secondary buttons 300–305 associated with the selected control button 202 are then displayed in the input section 110.

In one embodiment, the secondary buttons 300–305 may be oriented in a vertical fashion to the right of the control button 202, but close enough to the control button 202 to ergonomically enhance speed and ease of entry. In some embodiments, this spacing may be adjusted by the user. Alternatively, the secondary buttons 300–305 may be displayed in a variety of user-selected arrangements, including among other arrangements, horizontal, circular, semi-circular, and diagonal. Further, in some embodiments, the secondary buttons 300–305 may be displayed on a physically separate touch-sensitive display screen (not shown).

In other embodiments, the control buttons 200–204 may remain on the input section 110 while the secondary buttons 300–305 are displayed in one of the above-described arrangements next to the control buttons 200–204. In such embodiments, the non-selected control buttons 200, 201, 203, and 204 may be displayed with reduced shading or differing color to show that they have not been selected.

In another embodiment, the non-selected control buttons 200, 201, 203, and 204 may remain active, thereby allowing the user to change the set of secondary buttons 300–305 currently being displayed by selecting one of the previously non-selected control buttons 200, 201, 203, or 204.

Once the user selects a control button and the secondary buttons are displayed, the user may then select one of the secondary buttons 300–305. Upon user selection, a signal is sent to the processor, which in turn stores the user-selected character or other symbol on the storage medium and sends a signal to the display section 120 to display the selected character or other symbol.

In some embodiments, if the user does not select a secondary button 300–305 within a predetermined time, the secondary buttons 300–305 are removed from the input section 110, and the original set of control buttons 200–204 are returned to the input section 110.

In addition, the user may desire to have the character that is being input capitalized. In some embodiments, the user may capitalize a character by simultaneously touching the selected control button 200–204, in this example 202, and the desired secondary button 300–305. For example, if the user desires to input a "L", the user would simultaneously touch the area on the input section 110, representing the control button 202, and the area representing the secondary button 303. The processor will receive a signal from the input section 110 and in return store a "L" on a storage medium and send a signal to the display section 120 to display a "L".

Alternatively, in another embodiment, the user may quickly tap the input section 110 representing the desired secondary button 300–305 two times in succession, thereby alerting the processor to store and display a capital letter. Further, if the user wishes to capitalize all characters that will subsequently be input, he may quickly tap the area representing a control button 200–204 twice, thereby setting what is known as a "caps lock". The user may remove the caps lock by repeating the process of quickly tapping the area representing a control button 200–204 twice.

In some embodiments, a button representing a "shift" is displayed on the input section 110. In such embodiments, a user could capitalize a character by touching the "shift" button and the desired secondary button 300–305.

Once the user has selected a secondary button 300–305 to be input, the processor then removes the secondary buttons 300–305 and returns the original set of control buttons 200–204 to the input section 110. There is a slight delay between the time the desired secondary button 300–305 is selected and the removal of the buttons. This delay gives the user enough time to capitalize the desired character by the process described above but is short enough in duration to enhance the speed of overall operation and input.

The menu bar 230 displays available control buttons, functions, and options that are currently available to a user. In one embodiment, the menu bar 230 may display the buttons 231–236, which represent different sets of control buttons, for example, one for numbers 231, one for punctuation 232, one for mathematical functions 233, one for characters 234, one for battery supply 235, and one for user features 236. Other embodiments could include sets of control buttons other than those listed here. If the user desires to change the set of control buttons, or their arrangement, from those displayed on the input section 110, the user selects the desired control button 231–236 from the menu bar 230. The processor receives a signal from the menu bar in response to the user's input and subsequently removes the current set of control buttons, e.g., 200–204, from the input section 110 and displays a new set of control buttons on the input section 110. Thus, it should be clear that control buttons and secondary buttons can be designed to accommodate virtually any language or any symbol that might be desirable to input and display.

In addition, a user may select the user button 236 from the menu bar 230 allowing selection of optional features. In some embodiments, the user may select, among other things, how the buttons are being displayed on the input section 110, the size of the buttons, and the brightness/tint of the viewing area. For example, the control buttons can be arranged for either right- or left-handed users and in any desired shape and order. In some embodiments, a user could select to have the control buttons displayed vertically, as shown in FIG. 2, horizontally, circularly, semi-circularly, diagonally, or in any other arrangement.

The space bar button 210 is included in some embodiments to allow the user to easily input a space character. The space bar button 210 is located in an area that is easily accessible by the user to increase speed of input and ergonomic comfort. For example, the space bar button 210 may be located in a position easily accessible to the user by use of their thumb. Once the area of the input section 110 that is displaying the space bar button 210 is touched by the user, a signal is sent to the processor which in return stores a space character on a storage medium (not shown) and sends a signal to the display section 120 to display a space in the information that is currently being displayed. The display section 120, in response to the signal displays a space in the information currently being displayed. Alternatively, in some embodiments, the space bar button 210 may be included in the punctuation button set, which is represented by button 233.

The backspace button 220 allows the user to easily remove previously entered information. When the area of the input section 110 that is displaying the backspace button 220 is touched by a user, a signal is sent to the processor which in response to the signal removes the previously selected character or other symbol from memory and sends a signal to the display section 120 to remove the previously selected character or other symbol from the display. The display section 120 in response to the signal removes the character or other symbol from the display section 120 of the viewing area 100.

In another embodiment, the input section 110 of the viewing area 100 initially may not be displaying any buttons. The user may select a desired set of secondary buttons by touching the input section 110 with either one, two, three, four, or five simultaneous touches. In some embodiments, these touches may be performed by the user pressing one, two, three, four, or five fingers on the input section 110.

For example, an embodiment using English character input may have secondary buttons A, B, C, and D associated with the touch of one finger; secondary buttons E, F, G, and H associated with the touch of two fingers; I, J, K, L, M, and N associated with the touch of three fingers; O, P, Q, R, S, and T associated with the touch of four fingers; and U, V, W, X, Y, and Z associated with the touch of all five fingers. Upon receiving one to five simultaneous touches, the processor receives a signal and in response causes the corresponding secondary set of characters to be displayed on the input section 110. The user then may perform the remaining procedure of selecting an item as described above. After the user has selected a secondary button to be input or no selection has occurred in a predetermined amount of time, the input section 110 returns to blank and awaits a new set of touches from a user.

Figure 4:
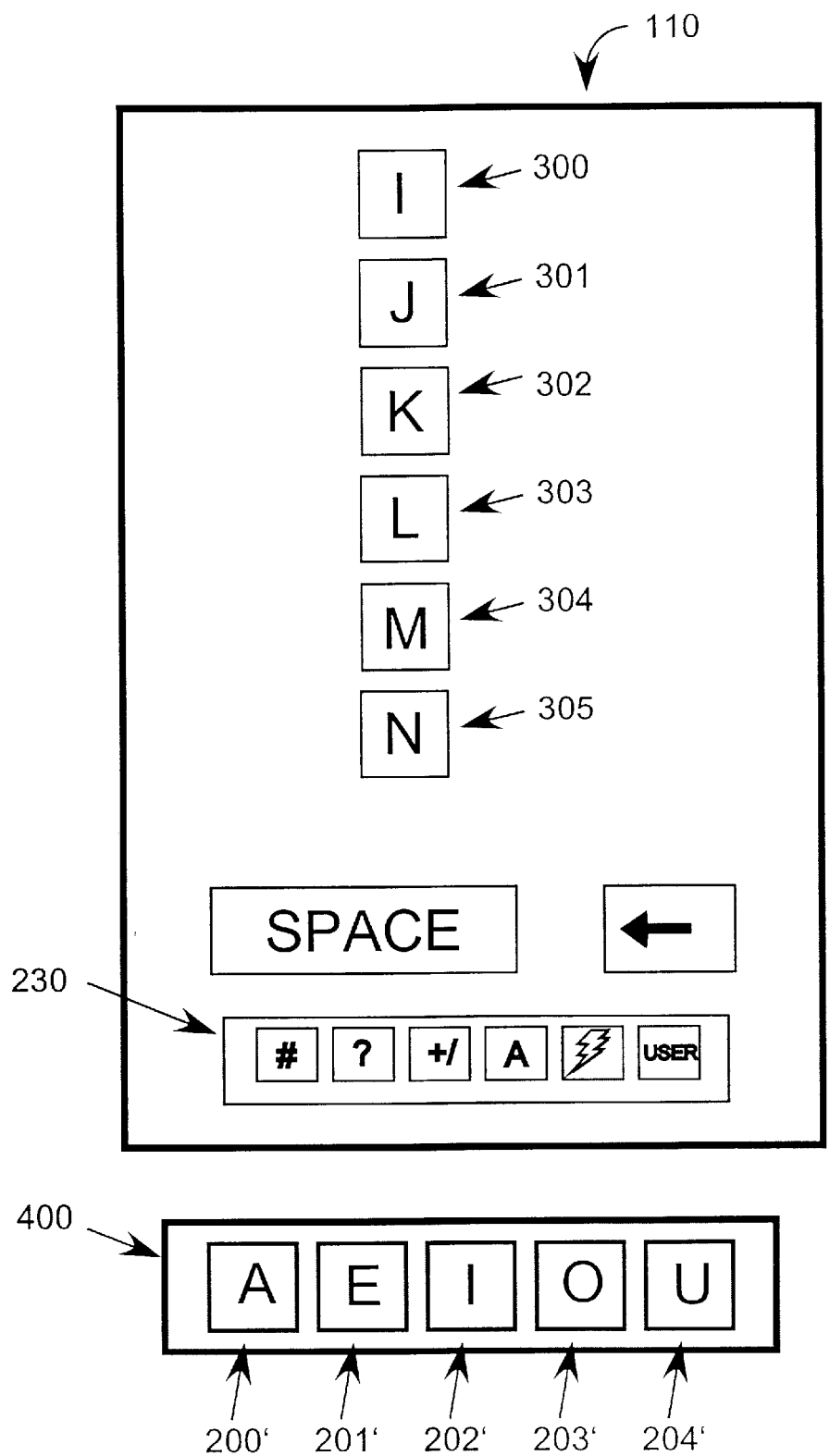
FIG. 4 is a representational diagram of an embodiment of the input section of the viewing area and associated keypad of a device in accordance with the present invention.

FIG. 4 represents an alternative embodiment of the invention. In the embodiment of FIG. 4, there is a keypad 400, functioning as part of the input section 110, in communication with the processor. The keypad 400 contains control buttons 200'–204'. Initially, the input section 110 of the viewing area 100 does not display any buttons. In some embodiments, the input section 110 of the viewing area 100 initially displays the menu bar 230.

The user performs the step of selecting a control button 200'–204' by pressing one of the buttons on the keypad 400. This selection sends a signal from the keypad 400 to the processor, which in return sends a signal to the input section 110 of the viewing area 100 to display the associated list of secondary buttons 300–305. The remaining procedure of the user selecting an item may be performed as described above. It is to be understood that although a 5-key keypad is illustrated, any number of keys could be used, including a standard typewriter-style (QWERTY) keyboard.

Figure 5:
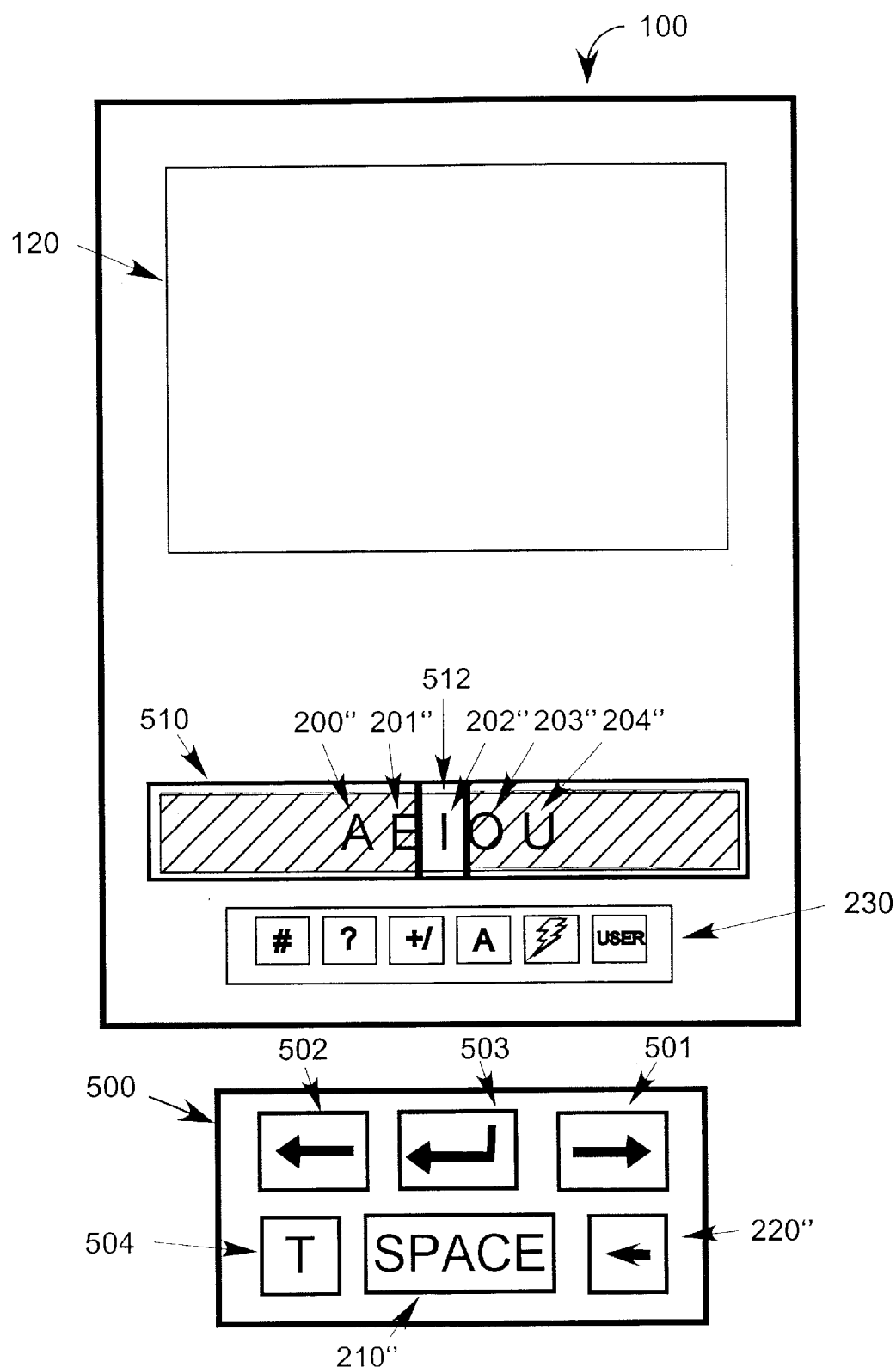
FIG. 5 is a representational diagram of another embodiment of the input section of the viewing area and associated keypad of a device in accordance with the present invention.

In yet another embodiment, as illustrated in FIG. 5, there is a keypad 500 functioning as part of the input section 110, which includes a forward arrow button 501, a back arrow button 502, a select button 503, a tab button 504, a space bar button 210", and a backspace button 220". In this embodiment, the keypad 500 is in communication with a processor. Additionally, the viewing area 100 need not be a touch-sensitive screen.

The viewing area 100 includes, among other things, a display section 120, a menu bar 230, and a scroll bar 510 (functioning as part of the input section), which has a set of control buttons represented within it and a selection window 512. As discussed above, the control buttons may represent, for example, the vowels of the English alphabet, mathematical symbols, numbers, or punctuation. In some embodiments, the scroll bar may be arranged horizontally, as seen in FIG. 5, vertically, or in any other arrangement. Further, the display section 120 can be represented on a physically separate display screen (not shown), thereby reducing the overall dimensions needed for the viewing area 100.

A user, for example, may select the control button 200"–204" that is currently located in the selection window 512 by pressing the select button 503, located on the keypad 500. The user may alter the control button 200"–204" that is currently in the select window 512 by pressing either the forward arrow button 501 or the back arrow button 502. Pressing the forward arrow button 501 or the back arrow button 502 sends a signal to the processor which in response to the signal moves the set of control buttons 200"–204" to the left or right respectively, thereby altering the control button 200"–204" that is being displayed in the selection window 512. In alternate embodiments, pressing the forward arrow button 501 or the back arrow button 502 may result in repositioning the selection window 512 to a new location within the scroll bar 510, thereby altering the control button 200"–204" that is available for selection.

Upon selection of a control button 200"–204" by a user, the processor receives a signal and in return removes the control buttons 200"–204" from the scroll bar 510 and replaces them with the list of secondary buttons associated with the selected control button 200"–204".

Figure 6:
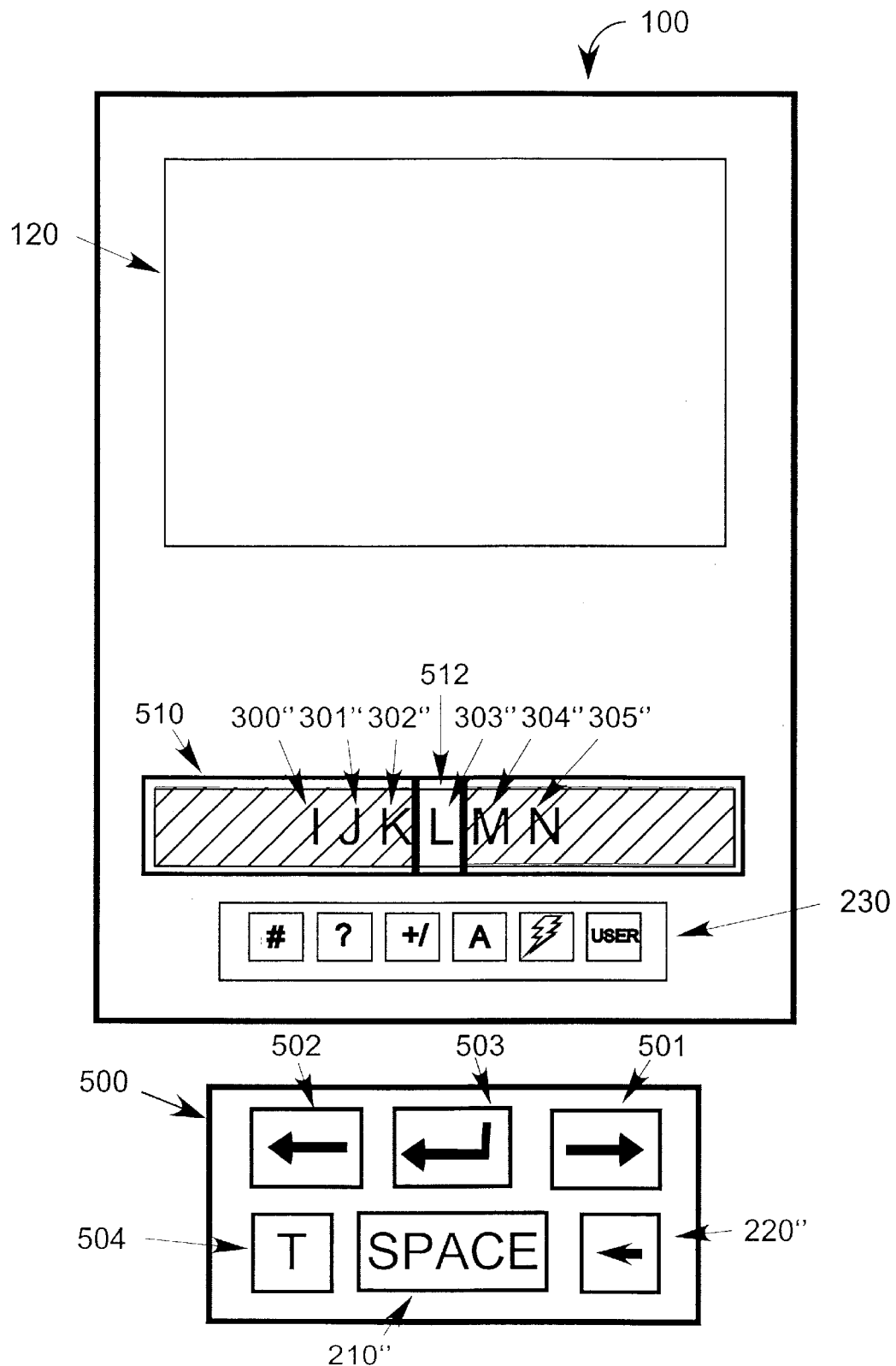
FIG. 6 is a representational diagram of the embodiment of FIG. 5 displaying secondary buttons in accordance with the present invention.

Referring to FIG. 6, for example, if a user selects control button 202" (FIG. 5), which represents the letter I, the control keys 200"–204" are removed from the display and the secondary buttons 300"–305" are then displayed in the scroll bar 510. The user may then select one of the secondary buttons 300"–305" by locating the desired button in the selection window 512 and pressing the select button 503 located on the keypad 500. This location is done by pressing the appropriate forward or back arrow button 501 or 502 respectively. Upon user selection, a signal is sent to the processor, which in turn stores the user-selected character or other symbol on a storage medium and sends a signal to the display area 120 to display the selected character or other symbol.

The user may input a space character by pressing the space bar button 210" or remove the last character entered by pressing the backspace button 220".

Additionally, the user may change the list of control buttons that are currently being displayed in the scroll bar 510 by pressing the tab button 504, which sends a signal to the processor, which in return activates the menu bar 230. The user may then use the forward and back arrow buttons 501 and 502 to navigate the menu bar 230 and select a desired set of control buttons by pressing the select button 503.

Figure 7:
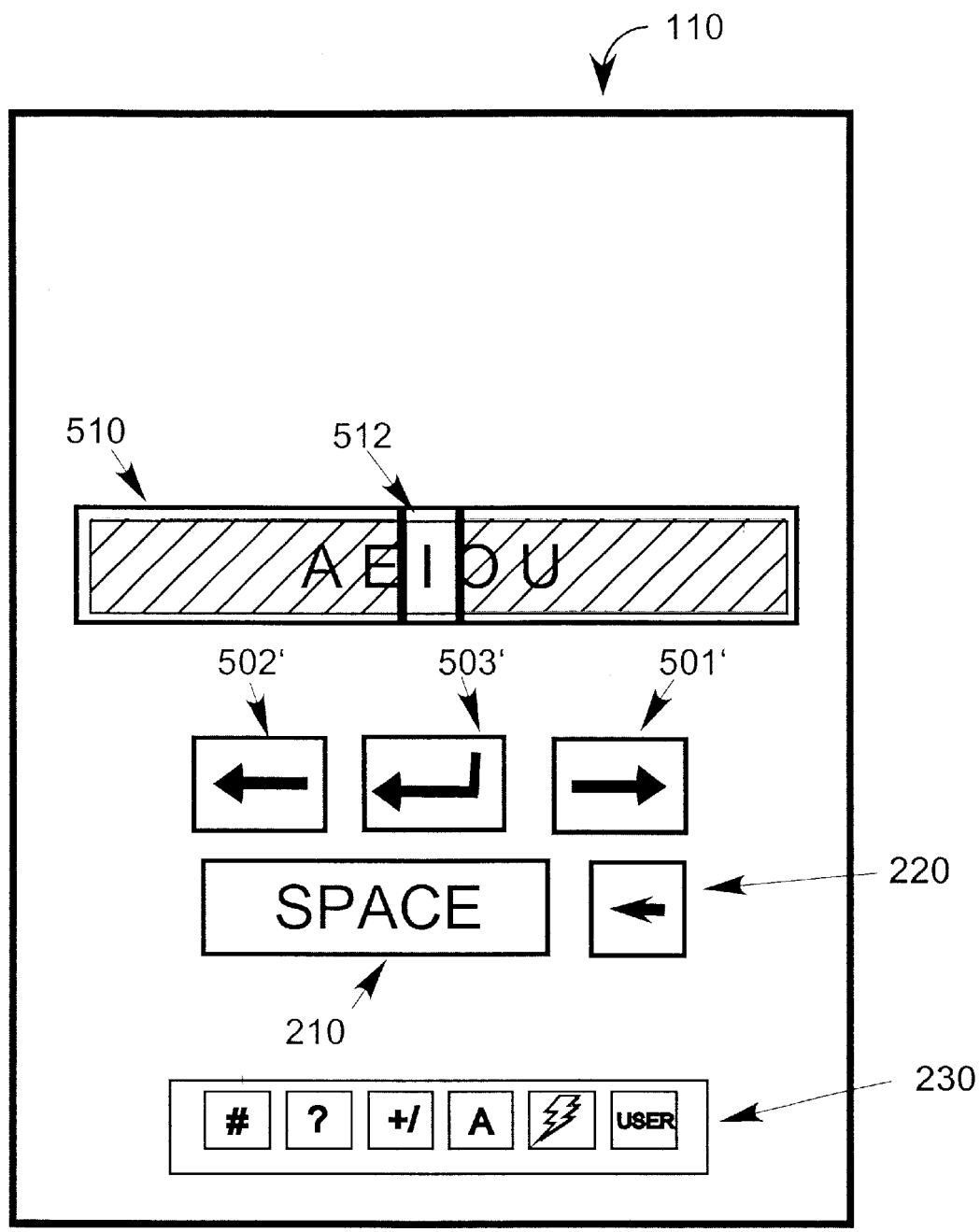
FIG. 7 is a representational diagram of still another embodiment of the input section of the viewing area of a device in accordance with the present invention.

FIG. 7 shows another embodiment of the present invention utilizing a touch-sensitive screen as the input section 110. In this embodiment, the input section 110 of the viewing area 100 displays, among other images, a forward arrow button 501', back arrow button 502', select button 503', space bar button 210, backspace button 220, menu bar 230, and a scroll bar 510, which has a set of control buttons represented within it, and a selection window 512. The user may perform the same functions as discussed above by pressing the area of the input section 110 that represents the forward arrow button 501", back arrow button 502', select button 503', space bar button 210, and backspace button 220.

Alternatively, in the embodiments represented by FIGS. 5 and 7, the scroll bar 510 may display control buttons which represent different sets of characters or other symbols, for example, one for numbers, one for punctuation, one for mathematical functions, and one for characters. A user may select a desired set of characters or other symbols by positioning the associated control button into the selection window 512 and pressing the select button 503. Upon selection of a control button, a signal is sent to a processor which in response to the signal removes the control buttons from the scroll bar 510, and displays the entire list of characters or other symbols associated with the user's selection in the scroll bar 510. For example, if a user selects a control button which represents the letters of the English alphabet, the control buttons are removed from the scroll bar 510, and the English alphabet is then displayed in the scroll bar 510.

A user may then select a desired character or other symbol by pressing the forward or back arrow buttons 501 and 502, thereby altering the character or other symbol being represented in the selection window 512 and pressing the select button 503. Upon user selection, a signal is sent to the processor which in response to the signal stores the selected character or other symbol on a storage medium and sends a signal to the display section 120 to display the selected character or other symbol.

Although a touch-sensitive screen is used frequently herein as exemplary, it is to be understood that any on-screen keyboard could be easily substituted and is contemplated. For instance, in most of the embodiments discussed above, the touch-sensitive display could be replaced with an on-screen keyboard that is activated by a pointing device, such as a stylus, pen, pointer, mouse, touch pad, heat device, light device, laser, wand, or infrared, radio, or sound signals.

In some embodiments of the present invention, the device has the capability of communicating with other computing devices for, among other things, transferring, receiving, synchronizing, and storing information. Such communication may be made using, for example, infrared, radio frequencies, other wireless communication medium, cable or twisted-pair.

Additionally, some embodiments may have a microphone and a speaker which can be used with, or in place of, the buttons, on-screen display, or touch-sensitive display for input of information and to record, store, and play back audio information.

The disclosed embodiments of the present invention are intended to be illustrative and not restrictive, and the scope of the invention is limited only by the claims that follow.

What is claimed is:

1. A hand-held device for the entry of data, comprising:
   a) a display screen; and
   b) a data entry input, appearing on said display screen, for entering data, said data entry input having all the letters of the alphabet and fewer than all such letters being displayable on said display screen at any one time, including
      (i) a first set of first control buttons appearing on said display screen; and
      (ii) a plurality of second sets of second buttons, each said second set of second buttons being associated with one of said first control buttons of said first set, wherein in response to selecting a first control button of said first set, one of said associated second sets of second buttons appears on said display screen for data entry; and
      wherein each of said first control buttons of said first set initially displays a single letter thereon.

2. A hand-held device according to claim 1, wherein each of said first control buttons of said first set is used to select said one associated set of said second sets of second buttons, wherein each of said second buttons displays a single letter, and wherein each said second button displaying a single letter is used to enter such single letter as datum.

3. A hand-held device according to claim 1, wherein said one associated second set of second buttons appearing on said display screen displays letters, each of which is a different letter than said single letter of said first control button of said first set.

4. A hand-held device according to claim 1, wherein said one associated second set of second buttons appearing on said display screen displays letters, one of which is the same as said single letter of said first control button of said first set and the others of which are different letters than said single letter of said first control buttons of said first set.

5. A hand-held device according to claim 1, wherein said first control buttons of said first set each displays a vowel.

6. A hand-held device according to claim 5, wherein said second buttons of each said second set comprises, respectively, consonants occurring between two sequential vowels.

7. A hand-held device according to claim 5, wherein said first control buttons are in a first array.

8. A hand-held device according to claim 5, wherein said first array is linear.

9. A hand-held device according to claim 8, wherein said second buttons of one of said second sets appears in a second array different than said first array.

10. A hand-held device according to claim 9, wherein said second array is linear.

11. A hand-held device according to claim 1, wherein said first control buttons of said first set appear in a first array, said second buttons of said second set appear in a second array, and wherein said first array and said second array are in close proximity on said display screen to enable a user's finger to select buttons of said first array and said second array with relatively limited travel.

12. A hand-held device according to claim 11, wherein said first array and said second array are vertical.

13. A hand-held device according to claim 11, wherein said first array and said second array are horizontal.

14. A hand-held device according to claim 1, wherein upon selection of a first control button of said first set, one of said second sets of second buttons appears on said display screen, in which said first control button then disappears from said display screen.

15. A hand-held device according to claim 1, wherein upon selection of a first control button of said first set, one of said second sets of second buttons appears on said display screen, in which said first control button disappears from said display screen and reappears as a button of said one second set on said display screen.

16. A hand-held device for entering data, comprising:
   a) a display screen;
   b) a set of control buttons appearing on said display screen, said control buttons displaying, respectively, the vowels A E I O U; and
   c) a plurality of sets of data entry buttons, each of said sets of data entry buttons appearing on said display screen in response to the selection of one of said control buttons, said data entry buttons of a given said set displaying, respectively, consonants sequentially occurring in the alphabet between two consecutive vowels.

17. A hand-held device according to claim 16, further comprising additional control buttons appearing on said display screen which are symbols other than vowels.

18. A hand-held device according to claim 17, wherein said symbols are an array of numbers, mathematical symbols, mathematical operators, punctuation or other such control objects, each such additional control buttons displaying a single such object.

19. A hand-held device for entering data, comprising:
   a) a display screen for selectively displaying a plurality of data entry buttons corresponding respectively to all the letters of an alphabet;
   b) a first set of first data entry control buttons displayable on said display screen and being fewer than said plurality of data entry buttons, each of said control buttons of said first set displaying a single letter of data entry information; and
   c) a second set of second data entry buttons displayable on said display screen and being fewer than said plurality of data entry buttons, each of said second set of second data entry buttons being displayed in response to the selection of one of said first data entry control buttons and displaying a single letter of data entry information, and wherein said second data entry buttons of said second set are used to enter said single letter as said data entry information.

20. A hand-held device according to claim 19, wherein said single letter is an alphabetic letter.

21. A hand-held device according to claim 19, wherein said first set further comprises another button having a symbol.

22. A hand-held device according to claim 21, wherein said symbol is a mathematical operation.

23. A hand-held device according to claim 21, wherein said symbol is a punctuation mark.

24. A hand-held device according to claim 16, wherein each of said control buttons is used to select one of said plurality of sets of data entry buttons, wherein each of said data entry buttons displays a single consonant, and wherein each said data entry button displaying a single consonant is used to enter such single consonant as datum.

25. A hand-held device according to claim 1, wherein in response to selecting one of said second buttons of said second set the others of said second buttons of said second set are removed from said display screen.

26. A hand-held device according to claim 16, wherein in response to selecting one of said data entry buttons of a given set, the other of said data entry buttons of said given set are removed from said display screen.

* * * * *